(12) United States Patent
Wienke et al.

(10) Patent No.: US 8,297,895 B2
(45) Date of Patent: Oct. 30, 2012

(54) AIR CARGO NET

(75) Inventors: Dietrich S. Wienke, Elsloo (NL); Christiaan H. P. Dirks, Dilsen (NL)

(73) Assignee: DSM IP Assets B.V., Heerlen (NL)

( * ) Notice: Subject to any disclaimer, the term of this patent is extended or adjusted under 35 U.S.C. 154(b) by 885 days.

(21) Appl. No.: 11/793,914

(22) PCT Filed: Dec. 22, 2005

(86) PCT No.: PCT/EP2005/014168
§ 371 (c)(1), (2), (4) Date: Mar. 17, 2008

(87) PCT Pub. No.: WO2006/066970
PCT Pub. Date: Jun. 29, 2006

(65) Prior Publication Data
US 2009/0080994 A1    Mar. 26, 2009

(30) Foreign Application Priority Data

Dec. 23, 2004  (EP) .................................... 04078491
Jul. 6, 2005    (EP) .................................... 05076542

(51) Int. Cl.
*B61D 45/00* (2006.01)
(52) U.S. Cl. .......................................... 410/118; 410/98
(58) Field of Classification Search ............. 296/100.15, 296/100.16; 410/98, 97, 100, 118, 117, 156
See application file for complete search history.

(56) References Cited

U.S. PATENT DOCUMENTS

| | | | |
|---|---|---|---|
| 119,765 A | 10/1871 | Hohorst | |
| 355,361 A | 1/1887 | Walsh | |
| 1,218,860 A | 3/1917 | Heyer | |
| 2,809,860 A | 10/1957 | Arnold | |
| 2,854,931 A * | 10/1958 | Campbell | ...................... 410/118 |
| 3,011,820 A | 12/1961 | Frieder et al. | |
| 4,000,344 A | 12/1976 | Dilbey | |
| 5,180,636 A | 1/1993 | Harazoe et al. | |

(Continued)

FOREIGN PATENT DOCUMENTS

CN    1016372    3/1989

(Continued)

OTHER PUBLICATIONS

International Search Report for PCT/EP2005/014168 mailed Feb. 16, 2006.

(Continued)

*Primary Examiner* — Glenn Dayoan
*Assistant Examiner* — Sunsurraye Westbrook
(74) *Attorney, Agent, or Firm* — Nixon & Vanderhye P.C.

(57) ABSTRACT

The invention relates to an air cargo net; that is to a net that is applied to restrain cargo that has been placed on a pallet and to prevent shifting of the cargo in an aircraft during transport, which net comprises a plurality of ropes made from polymer fibers, which ropes are joined at intervals to form meshes, the net having a central part and a plurality of lobes projecting there from, the peripheral meshes of each lobe being formed by a border rope, each border rope having a plurality of attachment fittings that are connected to the border rope by replaceable connecting ropes. The invention also relates to a method of connecting an attachment fitting to a rope of an air cargo net with an auxiliary connecting rope.

13 Claims, 1 Drawing Sheet

U.S. PATENT DOCUMENTS

| | | | |
|---|---|---|---|
| 5,407,623 A | | 4/1995 | Zachariades et al. |
| 5,452,973 A | | 9/1995 | Arvin |
| 5,716,176 A | * | 2/1998 | Anderson ............. 410/118 |
| 5,803,391 A | * | 9/1998 | Saperstein et al. ............. 242/395 |
| 5,970,697 A | * | 10/1999 | Jacobs et al. ............. 57/22 |
| 6,017,174 A | * | 1/2000 | Ross et al. ............. 410/100 |
| 6,077,793 A | * | 6/2000 | Hatjasalo et al. ............. 442/65 |
| 6,244,803 B1 | | 6/2001 | Parish et al. |
| 6,637,991 B2 | * | 10/2003 | Looker et al. ............. 410/97 |
| 7,070,373 B2 | * | 7/2006 | Brown ............. 410/97 |
| 7,240,475 B2 | | 7/2007 | Smeets et al. ............. 57/201 |
| 2002/0067971 A1 | * | 6/2002 | Chou ............. 410/97 |
| 2002/0067972 A1 | * | 6/2002 | Chou ............. 410/97 |
| 2004/0076488 A1 | | 4/2004 | Looker et al. |
| 2007/0202331 A1 | * | 8/2007 | Davis et al. ............. 428/375 |

FOREIGN PATENT DOCUMENTS

| | | |
|---|---|---|
| DE | 19953615 C2 | 12/2003 |
| GB | 1 218 860 | 1/1971 |
| GB | 2027077 | 2/1980 |
| GB | 2 338 472 | 12/1999 |
| JP | 08-041240 A2 | 2/1996 |
| JP | 2002-266186 A2 | 9/2002 |
| WO | 87/06915 | 11/1987 |
| WO | 02/062619 | 8/2002 |
| WO | 2004/067434 | 8/2004 |
| WO | 04/082995 | 9/2004 |

OTHER PUBLICATIONS

Ashley, "The Ashley Book of Knots", ISBN 057109659x, pp. 294 and 311 (1990).
Koziol et al, "High Performance Carbon Nanotube Fiber", *Science 318*, p. 1895 (2007).
Chinese Publication, ISBN 7-5430-1001-2/T-448 (1998).
EP 1827976, Opposition Decision, Aug. 19, 2011.
Allied Signal SPECTRA® Performance Materials (1996).
Polymer Online, Encyclopedia of Polymer Science and Engineering (1998).

\* cited by examiner

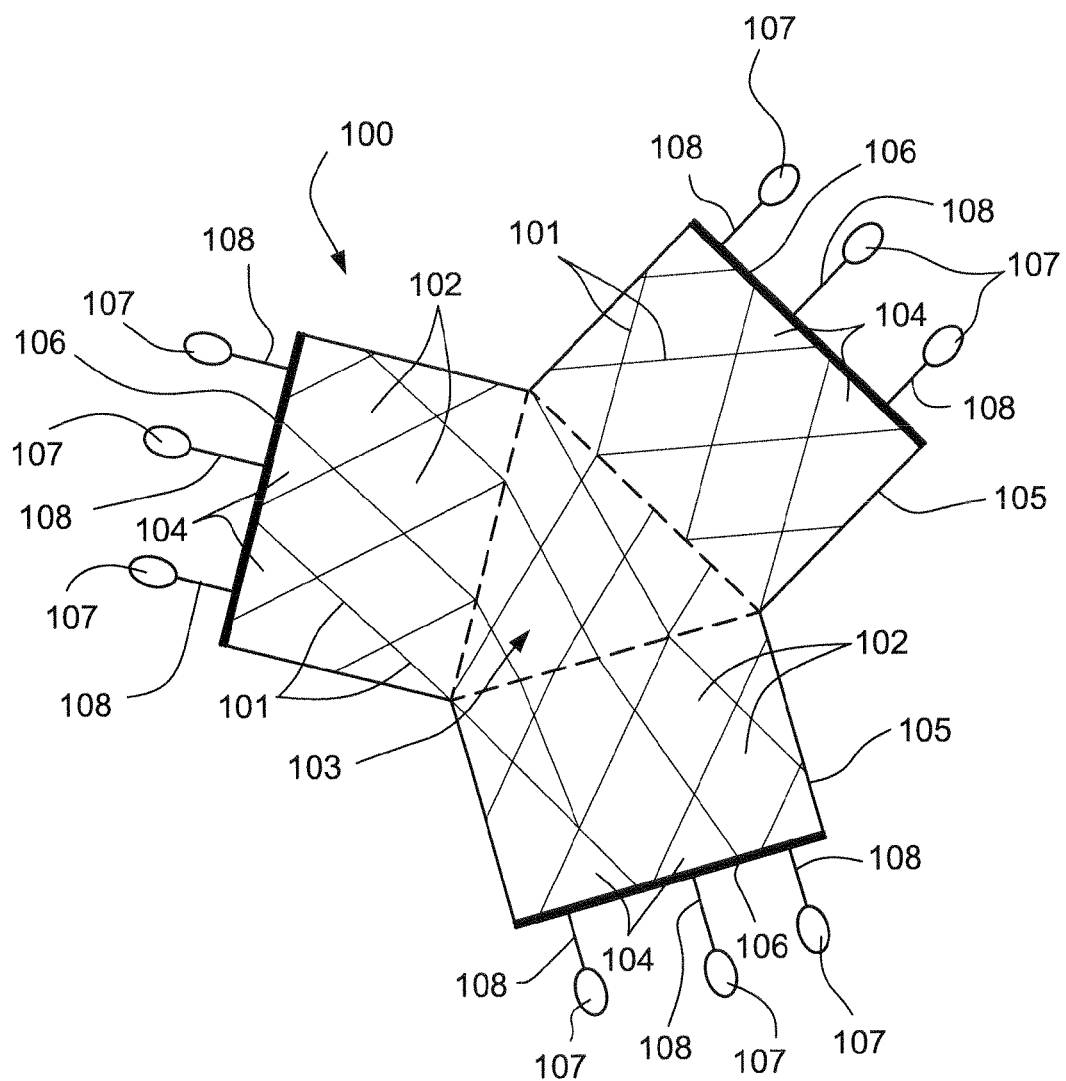

AIR CARGO NET

This application is the US national phase of international application PCT/EP2005/014168 filed 22 Dec. 2005 which designated the U.S. and claims benefit of EP 04078491.0 dated 23 Dec. 2004, and EP 05076542.9 dated 6 Jul. 2005, the entire content of each of which is hereby incorporated by reference.

FIELD

The invention relates to an air cargo net; that is to a net that is applied to restrain cargo that has been placed on a pallet and to prevent shifting of the cargo in an aircraft during transport. More specifically, the invention relates to a cargo net comprising a plurality of ropes made from polymer fibres, which ropes are joined at intervals to form meshes, the net having a central part and a plurality of lobes projecting there from, the peripheral meshes of each lobe being formed by a border rope, each border rope having a plurality of attachment fittings.

The invention also relates to a method of connecting an attachment fitting to a rope of an air cargo net.

BACKGROUND AND SUMMARY

A typical air cargo net, also called pallet net or air freight net, is cruciform in shape, and has a generally rectangular central part of about the same size as the pallet, and four generally rectangular lobes or wings extending there from, having a length about equal to the maximum load height of the pallet. To secure cargo on a pallet, the net is placed over the cargo and the net lobes are brought down. The ends of the lobes are attached to the sides of a pallet with the pallet attachment fittings, e.g. so-called double studs, fixed to a border rope forming the peripheral end meshes of a lobe, which fittings are adapted to engage with complementary devices on the pallet. Adjacent sides of the lobes meeting at the corner are releasable secured together, for example with a corner rope or lashing line, which extends from the central panel between the lobes, or with connecting elements attached to the sides of the lobes. The air cargo net can further comprise a plurality of adjusting hooks, for example reefing or spring-closed hooks, fixed to a rope of a mesh, which can be used to further tension the net over the cargo by pulling and connecting to other mesh ropes. To release the net for unloading, above actions are reversed.

Air cargo nets should fulfil different requirements in order to safely and securely restrain cargo loads from shifting on a pallet during loading and unloading, and during flight; also under more extreme circumstances like during atmospheric turbulence. An air cargo net should thus be strong, and resistant to abrasive conditions, but at the same time be as lightweight as possible, in order not to unduly increase the payload of an aircraft. During use, cargo nets are subjected to substantial wear and tear conditions leading to extensive abrasion on the net, or damage from repeated attachment and removal from the cargo pallet, or from dragging across floors.

Air cargo nets should fulfil various design and performance criteria, as described in various standards, like NAS 3610. Checking the condition of a net before each use is also prescribed, and a pallet net shall be deemed inoperative if it exhibits a defect like more than one strand of frayed or otherwise damaged rope, or missing or inoperative attachment fittings (see e.g. SAE ARP5486).

Such an air cargo net is for example known from WO 2004/082995 A1. This publication discloses an air cargo net comprising a plurality of ropes made from polymer fibres, which ropes are joined at intervals to form meshes, the net having a rectangular central part and four rectangular lobes projecting there from, the peripheral meshes of each lobe being formed by a border rope, each border rope having a plurality of attachment fittings, and four corner ropes extending from the central panel between the lobes. The net and border ropes are preferably braided from ultra-high molar mass polyethylene fibres, whereas the corner ropes preferably are braids from polyester, polyamide or polypropylene fibres. Attachment fittings and adjusting hooks are fixed to the net by the respective border and net ropes passing through an eye of the fitting or hook. This way of connecting fittings is representative for state-of-the art cargo nets.

A drawback of the known air cargo nets is that the operation of releasing the net from the cargo for unloading is frequently troublesome, due to one or more of the attachment fittings not readily unlocking; for example caused by corrosion or pallet edge damage. It appears quite common for cargo handlers in such case to cut the border rope with a knife or scissors at the mesh with the connected malfunctioning fitting. Such a borderline cut necessitates net repair, which is costly for at least two reasons. Firstly, a repair event withdraws the net from use in air cargo transport until repair is finished; requiring the airlines to keep additional net stock to bridge repair times. Secondly, net repair itself may only be performed by certified companies, and is laborious.

The object of the invention is therefore to provide an air cargo net that is less prone to cutting of the border rope, and that has longer effective service time.

This object is achieved according to the invention with an air cargo net wherein the attachment fittings are connected to the border rope by replaceable connecting ropes.

The connecting rope is an auxiliary rope that is replaceably attached to the net rope and fitting, for example by knotting. Replaceable is understood to mean that the connecting rope can be removed from the net without damaging other net ropes, for example by untying the knot that attaches the connecting rope to the net, by simply cutting the connecting rope, and a replacement connecting rope with fitting can be subsequently attached. The connecting rope has such strength that after being attached to the border rope and fitting the net still fulfils all relevant requirements.

A cargo net wherein the attachment fittings are connected to the border rope by a replaceable connecting rope needs less frequent repair off-site. The cargo handler, for example, can cut or remove the connecting rope to release the net from the pallet, instead of cutting the net or border rope. A further advantage of the replaceable connecting rope is that any person, but preferably a qualified technician, can locally and quickly replace a missing or damaged connecting rope and fitting, such that the cargo net is directly operational again for a next flight. Since the net and border ropes forming meshes are not damaged the net itself needs not be repaired at specialised companies. This way the number of repair events and the number of spare nets of an airline are significantly reduced, the use efficiency of the net is increased; and overall system costs are markedly reduced.

BRIEF DESCRIPTION OF THE DRAWING

The accompanying drawing FIGURE shows a cargo net in accordance with an embodiment of the invention.

DETAILED DESCRIPTION

A cargo net 100 is depicted in the accompanying FIGURE as being comprised of a plurality of ropes 101 made from polymer fibres and are joined at intervals to form meshes 102. The net 100 has a central part 103 and a plurality of lobes 105 projecting therefrom. The peripheral meshes 104 of each lobe 105 are formed by a border rope 106 with each border rope 106 having a plurality of attachment fittings 107. The attachment fittings 107 are connected to the border rope 106 by replaceable connecting ropes 108.

The cargo net 100 comprises a plurality of ropes 101 that can be made from natural, synthetic or mixed fibres. The net and border ropes 101 and 106, respectively, in the net 100 can be of various constructions, like a laid, braided, or woven construction (such latter rope construction is also referred to as a webbing). Within the context of the present application, rope is understood to include any construction suitable for making a cargo net. Preferably the ropes have been made from synthetic polymer fibres, like polyester, polyamide, polyethylene or polypropylene fibres. The fibres can be used in the form of, optionally twisted, multi-filament yarns, but also as pre-formed ropes or cords. The net can also be made from slit film polymer lines as disclosed in GB2338472 A.

In a preferred embodiment the polymer fibres are high-strength fibres having a tenacity of at least 1.5 N/tex; like aromatic polyamide fibres (aramids, like yarns available under the Twaron® or Kevlar® trademarks) or fibres made from ultra-high molar mass, also called ultra-high molecular weight, polyethylene (UHMWPE), such as yarns marketed with trademarks Dyneema® or Spectra®. A net made of these high-performance fibres has a significantly lower weight than a net made from conventional fibres, but a higher initial cost price. The advantages provided by the present invention, lower costs of repair and longer effective service time, make such nets economic in use. Most preferably, the net is made from ropes made of UHMWPE, since these fibres provide better abrasion resistance and further weight reduction.

Ultra-high molar mass polyethylene has an intrinsic viscosity (IV) of more than 4 dl/g. The IV is determined according to method PTC-179 (Hercules Inc. Rev. Apr. 29, 1982) at 135° C. in decalin, the dissolution time being 16 hours, with DBPC as anti-oxidant in an amount of 2 g/l solution, and the viscosity at different concentrations is extrapolated to zero concentration. Intrinsic viscosity is a measure for molar mass (also called molecular weight) that can more easily be determined than actual molar mass parameters like $M_n$ and $M_w$. There are several empirical relations between IV and $M_w$, for example $M_w=5.37\times10^4 [IV]^{1.37}$ (see EP 0504954 A1), but such relation is dependent on molar mass distribution. UHMWPE fibres, e.g. filament yarn, can be prepared by spinning of a solution of UHMWPE in a suitable solvent into a gel fibre and drawing the fibre before, during and/or after partial or complete removal of the solvent; that is via a so-called gel-spinning process as for example described in EP 0205960 A, in WO 01/73173 A1, in Advanced fiber spinning technology, Ed. T. Nakajima, Woodhead Publ. Ltd (1994), ISBN 185573 182 7, and in references cited therein. The UHMWPE fibres preferably have an IV of between about 5 and 40 dl/g, more preferably between 7 and 30 dl/g. Preferably, the UHMWPE is a linear polyethylene with less than one branch per 100 carbon atoms, and preferably less than one branch per 300 carbon atoms, a branch or side chain usually containing at least 10 carbon atoms. The linear polyethylene may further contain up to 5 mol % of one or more comonomers, such as alkenes like propylene, butene, pentene, 4-methylpentene or octene.

The UHMWPE fibres applied in the net according to the invention may further contain small amounts, generally less than 5 mass %, preferably less than 3 mass % of customary additives, such as anti-oxidants, thermal stabilizers, colorants, flow promoters, etc. The UHMWPE can be a single polymer grade, but also a mixture of two or more different polyethylene grades, e.g. differing in IV or molar mass distribution, and/or type and number of comonomers or side chains.

The UHMWPE fibres applied in the net according to the invention preferably have a strength of at least 2.0 N/tex, more preferably at least 2.5, 2.8 or even 3.0 N/tex, because such high-strength fibres of relatively low density enable a light-weight yet very strong cargo net. Tensile strength, also simply strength, or tenacity are determined by known methods, as based on ASTM D885-85 or D2256-97.

The ropes 101 of the net 100 may be of various constructions, like braided or laid ropes, woven webbings or tapes. The net ropes, border ropes, corner ropes, and connecting ropes may all be of the same or similar construction and type of fibres, but also different; as for example indicated by WO 2004/028908 A2 or U.S. Pat. No. 6,637,991 B2.

The net and border ropes 101 and 106, respectively, are joined at intervals to form meshes 102. The joints can be made by known techniques, like knotting, splicing or by forming interpenetrating joints such as described in U.S. Pat. No. 4,000,344. Mesh dimensions are prescribed by international aviation regulations, and are generally not greater than 25 cm along each side. The mesh shape may be any conventional shape, e.g. diamond or square.

Pallet attachment fittings 107, such as double studs, are connected to the end of the net lobes 105, e.g. to the border rope 106, at regular intervals, the minimum distance between fittings 107 being prescribed by international aviation regulations. Fittings, and hooks, are generally made from metal, although engineering plastics could be used alternatively. In a preferred embodiment, fittings and hooks are made of magnesium; these light-weight yet strong fittings further contribute to weight reduction of the system.

Selected meshes 102 of the net 100 generally have an adjusting hook connected to it, which hook can be used to shorten or tension the net, for example if a pallet is not loaded to its maximum height. Conventionally, these hooks are connected to the net by the rope forming the mesh passing through an eye of the hook. These hooks may also be fixed to the net by an auxiliary connecting rope according to the invention. Therefore, within the context of the present invention, an attachment fitting, or simply fitting is also understood to comprise an adjusting hook.

The connecting rope 108 is preferably flexible, and has such thickness that it can be easily pulled through the eye of a pallet attachment fitting 107, and connected to the border mesh 104. The length of the connecting rope 108 is preferably such that it allows easy handling, but is not that long that it would unnecessary extend the size of the net 100.

The connecting rope 108 has such strength that after being fixed to the border rope 106 and fitting 107, for example by knotting, the net still fulfils all requirements. Since in general the strength of a knotted rope is significantly lower than the strength before applying a knot, the tensile strength of the connecting rope as such is preferably higher than the strength of the net (that is of net ropes and border ropes in the net construction).

Preferably, the connecting rope 108 is made from synthetic polymer fibres such as polyester, polyamide, polyethylene, polypropylene fibres, or mixtures thereof.

In a special embodiment of the invention the net 100 and border ropes 106 are predominantly made from ultra-high molar mass polyethylene fibres, and the connecting ropes are made from polyester or polyamide fibres. The advantage of this embodiment is that the connecting ropes 108 show higher elongation at break than the other ropes, such that sudden local net loadings can be better absorbed.

In another preferred embodiment the connecting rope 108 comprises high-strength fibres as described above, more preferably high tenacity fibres made from ultra-high molar mass polyethylene. In order to lower the price and to achieve a desired combination of properties such as weight, strength, elongation and elasticity, a combination of for example polyester with UHMWPE fibres, or aliphatic polyamide and aramid fibres can be chosen. A connecting rope made from high tenacity fibres has the advantage that it can be relatively thin, and still have the desired strength level; which limits weight and makes connecting to fitting and rope easier. Ropes made from UHMWPE fibres in addition show better resistance to abrasion caused by sliding fittings.

The connecting rope 108 can have the same or a different textile construction as the other textile parts of the air cargo net, and can for example be a braided, laid, woven, wrapped, knitted construction or a combination thereof.

Preferably, the connecting rope 108 has a colour contrasting with the ropes forming meshes, to enable easy identification by the handler. In addition, or alternatively, the connecting rope 108 has a different surface texture to distinguish it from the other net ropes.

In a preferred embodiment of the invention the connecting rope 108 is an endless rope or tape, generally called a sling. The advantage of a sling is that connections to a fitting having an eye, as well as to a net mesh, can be made with simple known knots, hitches or bends, which also show relatively high knot strength retention. Such a knot is for example the cow hitch, also called bale sling hitch, ring hitch, or tag knot; which can be made by passing one loop end of the sling through an eye, or a mesh, and then passing this loop through the opening formed by the other end of the sling (also called tail), and subsequently pulling the first end to tighten the knot. The skilled person can easily select other suitable knots, for example the so-called double ring hitch, the Kellig hitch, or Prusik and Klemheist knots. These and other knots, and methods to make them can be found in for example 'Handbook of knots', (Dorling Kindersley Book, London 1998; ISBN 0751305367), and in "The Ashley book of knots" (Faber and Faber Ltd, London 1990; ISBN 057109659x).

It is true that in WO 02/062619 A1 an air cargo net is described that also comprises looped ropes or slings, which are used as securing devices for the corner parts of the net lobes. These ropes are indicated to form an integral part of the net such that they cannot be removed without damaging the net. The publication, however, does not contain any indication or suggestion that fittings should be replaceably connected via a rope or sling to the net.

A rope or tape sling can be made by known methods, for example by connecting a certain length of rope or webbing end-to-end by sewing, knotting, splicing or welding. Preferably, the end-to-end connection does not increase the thickness of the rope more than about a factor 2, because this would hamper flexibility and ease of connecting to a fitting. In one embodiment, the sling is made by sewing both ends of a woven strap together. In another embodiment a braided or laid rope is connected with a splice.

A sling is within the present application understood to include a double loop, or double eye, or a triple eye. Such constructions are known to the skilled man, and can for example be made by splicing a loop on each end of a rope, or by making one or more connections, e.g. by sewing, in the middle part of a sling.

Optionally, the sling may have been coated, or covered with tape or with a fabric to protect the fibres and/or to increase its abrasion resistance.

In special embodiment, the connecting rope is a sling, comprising a core formed by a plurality of windings of fibres, preferably essentially parallel multi-filament yarns, and a covering sheath, e.g. a woven or braided tubular fabric.

Preferably, such a sling comprises a core of parallel high-strength yarns, preferably UHMWPE yarns, and has a sheath made from polyester, polyamide, aramid, or UHMWPE fibres, or from a mixture thereof.

The net 100 according to the invention contains a connecting rope 108 that can have been attached to the border rope 106 by knotting. An advantage hereof includes that the connecting rope can be removed when needed by untying, without causing damage. A disadvantage is that the connecting rope with fitting may also be easily removed by someone with less honest intentions. Therefore, the connecting rope 108 attached to the border rope 106, for example knotted thereto, or the applied knot is preferably fixated or immobilised; for example by stitches or by applied adhesive. Such a fixated connecting rope can when needed by removed by cutting the connection rope.

The invention further relates to a method of connecting an attachment fitting 107 having an eye to an air cargo net with a connecting rope 108, e.g. a sling. The skilled person will recognize that there are several suitable ways for making this connection, including knotting. In a preferred embodiment, the method comprises the steps of a) attaching an endless sling to the fitting element by passing one end loop of the sling at least once through the eye (opening) of the fitting (or hook), then passing this end through the opening formed by the other end of the sling, and subsequently pulling the first end to tighten the knot;

b) passing the sling end at least once over a rope of a mesh of the cargo net, then passing the other end with the attached fitting through the loop, and subsequently pulling this end with the fitting to tighten the knot around the mesh rope.

In a preferred embodiment of the invention the sling end is passed only once through the eye and mesh in steps a) and b), respectively.

In another preferred embodiment of the method according to the invention, step b) comprises passing the sling end through the opening of the fitting and the mesh twice, resulting in a shorter connection between fitting and net, and in 4 bridging rope strands. This embodiment can advantageously be applied for relatively thin and long connecting slings, which have high flexibility and are easier to handle and connect. A further advantage is that load is distributed over 4 strands, exerting less force on applied knots (knot strength is generally significantly lower than linear strength of a rope).

The method according to the invention can further comprise a step of fixating the attached connecting rope, e.g. a sling knotted to fitting and net, by applying fixation means. Suitable fixation means include stitches, adhesives, or heat; and are preferably applied to the knot or knots, or applied to interconnect at least two parts of the connecting rope, e.g. a sling, between border rope and fitting. Preferably, the fixation means are stitches, because they can be easily and well-controlled applied at the desired location. Preferably, stitching is done with a yarn containing high-strength fibres.

In a further embodiment the fixation means are adhesives, preferably liquid adhesives that can be cured after application. The liquid adhesive is preferably injected into the applied knot, and then cured to fixate the knot. The connecting rope can also be fixated by locally applying heat such that the rope fibres partly melt and fuse together. Care should be taken that the fixation means are not applied in such way that the connecting rope and border rope are fixated together in such way that removing the connecting rope without damaging the remainder of the net becomes impossible.

The method according to the invention can conveniently be applied to replace a damaged connection rope or fitting in short time, by almost any person.

The invention claimed is:

1. Cargo net comprising a plurality of ropes made from polymer fibres, wherein the ropes are joined at intervals to form meshes, the net having a central part and a plurality of lobes projecting therefrom, wherein peripheral meshes of each lobe are formed by a border rope, each border rope having a plurality of attachment fittings, and wherein the net comprises replaceable connecting ropes which connect the attachment fittings to the border ropes.

2. Cargo net according to claim 1, wherein the polymer fibres are high-strength fibres having a tenacity of at least 1.5 N/tex.

3. Cargo net according to claim 2, wherein the fibres are made from ultra-high molar mass polyethylene.

4. Cargo net according to claim 1, wherein the connecting ropes comprise high-strength fibres.

5. Cargo net according to claim 4, wherein the fibres are made from ultra-high molar mass polyethylene.

6. Cargo net according to claim 1, wherein the connecting ropes have a colour contrasting with the ropes forming the meshes.

7. Cargo net according to claim 1, wherein the connecting ropes form a sling.

8. Cargo net according to claim 7, wherein the sling comprises a core formed by a plurality of windings of fibres and a covering sheath.

9. Cargo net according to claim 8, wherein the fibres in the core are essentially parallel high-strength yarns and the sheath is made from polyester, polyamide, aramid, or UHMWPE fibres, or from a mixture thereof.

10. Cargo net according to claim 8, wherein the fibres in the core are UHMWPE yarns.

11. Method of connecting an attachment fitting having an eye to an air cargo net, comprising the steps of
  a) attaching an endless sling to the fitting element by passing one end loop of the sling at least once through the eye of the fitting, then passing this end through the opening formed by the other end of the sling, and subsequently pulling the first end to tighten the knot;
  b) passing the sling end at least once over a rope of a mesh of the cargo net, then passing the other end with the attached fitting through the loop, and subsequently pulling this end with the fitting to tighten the knot around the mesh rope.

12. Method according to claim 11, further comprising a step of fixating the sling after attaching to the mesh rope by applying fixation means.

13. Method according to claim 12, wherein the fixation means are stitches.

* * * * *